United States Patent [19]

Perkowski

[11] Patent Number: 4,863,026

[45] Date of Patent: Sep. 5, 1989

[54] STORAGE CASES FOR INFORMATION RECORDING DEVICES

[76] Inventor: Thomas J. Perkowski, 130 Theodore Fremd Ave., Rye, N.Y. 10580

[21] Appl. No.: 193,855

[22] Filed: May 13, 1988

[51] Int. Cl.$^4$ ........................................... B65D 85/672
[52] U.S. Cl. .................. 206/387; 206/45.31; 206/312; 206/459; 350/243
[58] Field of Search .................. 206/45.31, 45.34, 311, 206/312, 232, 387, 444, 459; 350/242, 243

[56] References Cited

U.S. PATENT DOCUMENTS

| | | | |
|---|---|---|---|
| 3,272,325 | 9/1966 | Schoenmakers | 206/387 |
| 3,754,639 | 8/1973 | Gellert | 206/387 |
| 3,910,408 | 10/1975 | Husney et al. | 206/45.31 |
| 4,044,889 | 8/1977 | Orentreich et al. | 206/459 |
| 4,116,333 | 9/1978 | Pavel | 206/380 |
| 4,154,338 | 5/1979 | Adler | 206/387 |
| 4,363,403 | 12/1982 | Raucci, Jr. et al. | 206/387 |
| 4,385,693 | 5/1983 | Gelardi et al. | 206/387 |
| 4,428,482 | 1/1984 | Ogawa | 206/387 |
| 4,527,690 | 7/1985 | Schmidts et al. | 206/387 |
| 4,545,479 | 10/1985 | Figari | 206/45.34 |
| 4,595,095 | 7/1986 | Lam | 206/45.34 |
| 4,635,792 | 1/1987 | Yamada et al. | 206/444 |
| 4,643,301 | 2/1987 | Hehn et al. | 206/232 |
| 4,648,507 | 3/1987 | Komiyama et al. | 206/387 |
| 4,673,083 | 6/1987 | Schuett | 206/387 |
| 4,706,813 | 11/1987 | Schneider et al. | 206/387 |
| 4,743,077 | 5/1988 | Bohnet et al. | 206/387 |

FOREIGN PATENT DOCUMENTS

| | | | |
|---|---|---|---|
| 177415 | 4/1986 | European Pat. Off. | 206/444 |
| 3013879 | 10/1981 | Fed. Rep. of Germany | 206/232 |

Primary Examiner—David T. Fidei
Attorney, Agent, or Firm—Thomas J. Perkowski

[57] ABSTRACT

A storage case for an information recording device and an accompanying program including printed or otherwise recorded graphical subject matter, such as a printed program booklet or optically transparent film structure. The storage case comprises an enclosing case for enclosing and storing the information recording device and the program substantially therewithin. The enclosing case has at least one optically transparent panel with a Fresnel lens zone structure formed therein. The enclosing case provides for the positioning of the graphical subject matter of the program, a range of distances from the optically transparent panel and is intended for the viewing of the graphical subject matter through the optically transparent panel, whereby the graphical subject matter is magnified when viewed through the Fresnel lens zone structure formed in the optically transparent panel.

The storage case of the present invention is for storing a digital audio-cassette tape (DAT), an analog audio-cassette tape compact disc (CD), or a video-cassette tape, and in the preferred embodiment includes spaced-apart guide channels disposed on the storage case for slideably holding the accompanying program, at a predetermined distance away from the Fresnel lens zone structure.

13 Claims, 5 Drawing Sheets

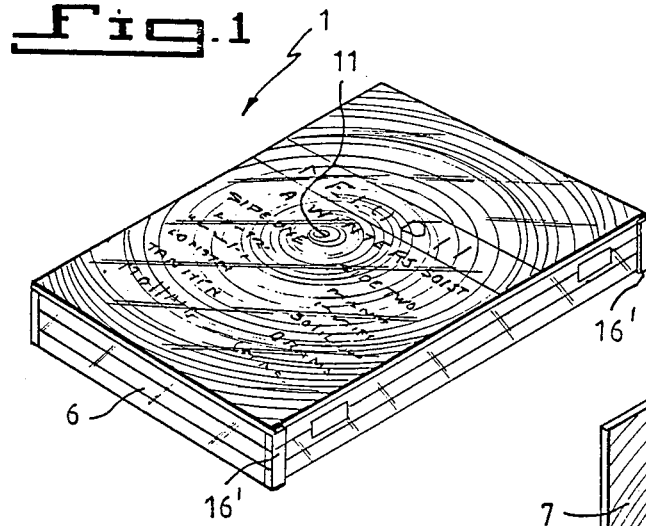
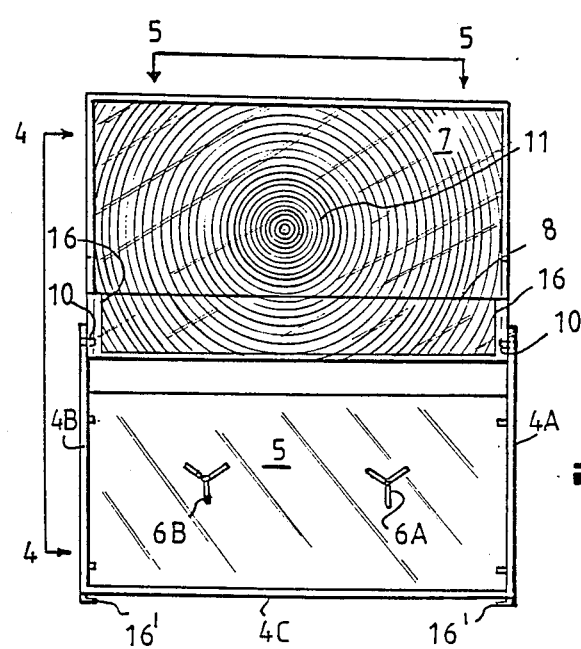
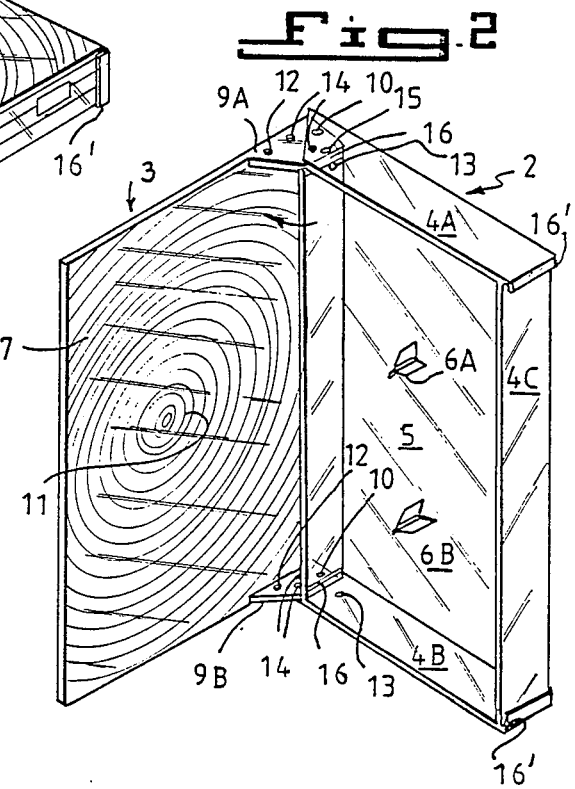
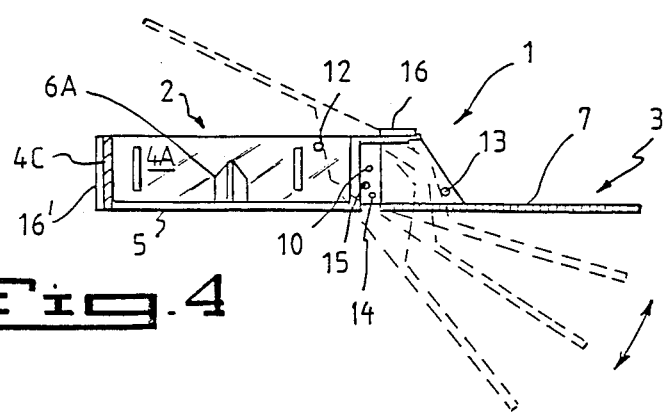

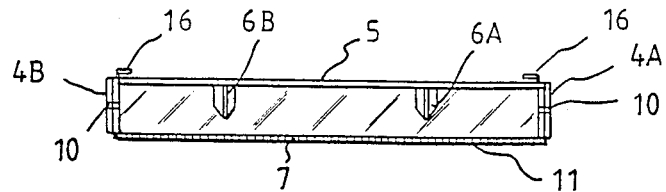
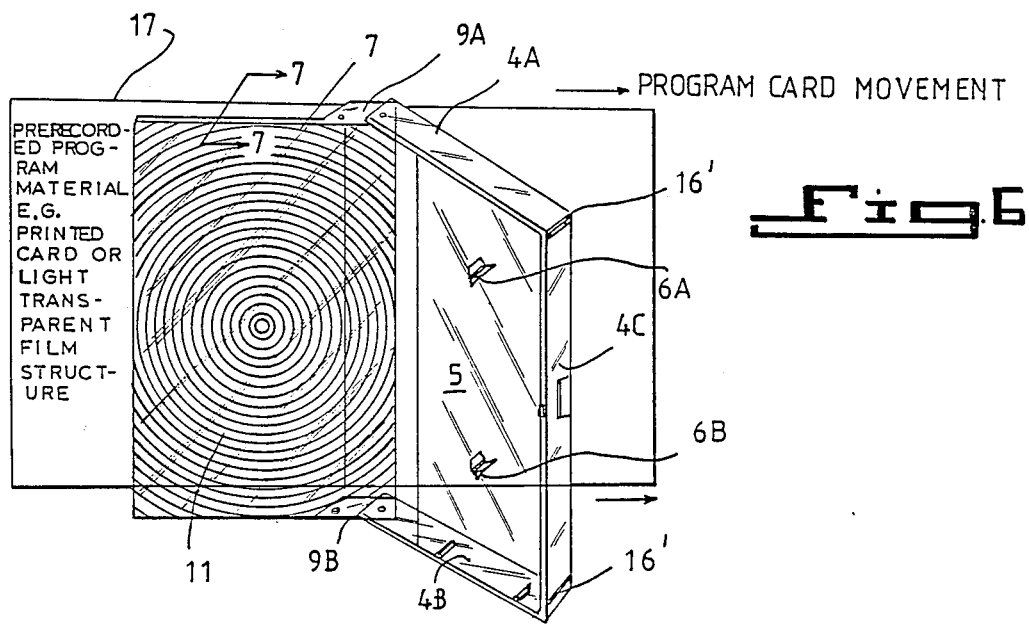
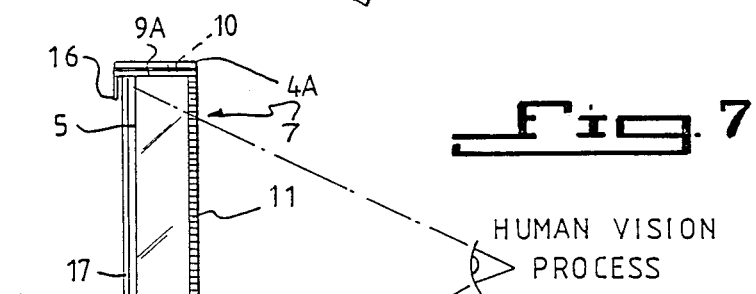
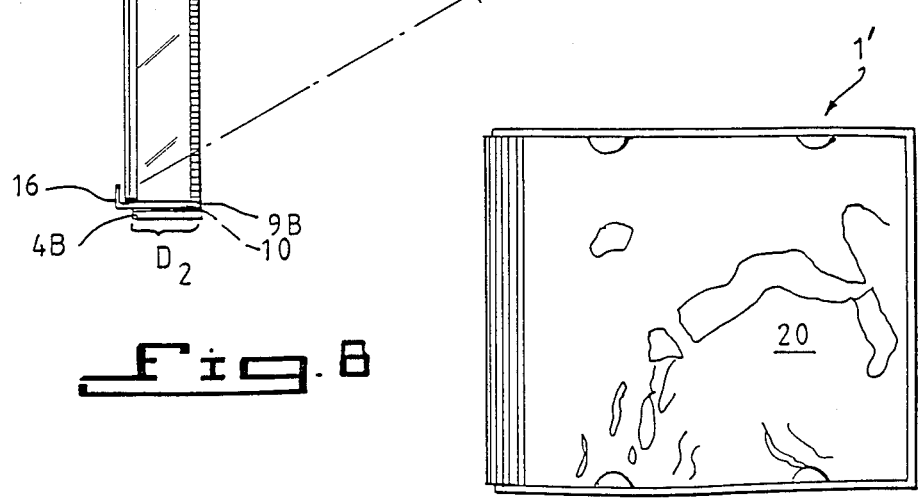

STORAGE CASES FOR INFORMATION RECORDING DEVICES

FIELD OF INVENTION

The present invention relates to storage cases which are used for storing information recording devices such as digital audio tapes (DAT), analogue audio-cassette tapes, compact discs (CD), video-cassette tapes and the like, and accompanying programs including printed and other graphical subject matter. More particularly, the present invention relates to such types of storage cases having the capability of magnifying the printed subject matter of the accompanying programs, which capability is provided by using optical fabrication techniques to form Fresnel magnifying lenses in or upon optically transparent panels of such storage cases.

BACKGROUND OF THE INVENTION

For quite some time, long playing (LP) vinyl record discs while having poor information recording characteristics by modern standards, have nevertheless enabled a recording artist to publish simultaneously and simply, an accompanying program including printed words and visual graphics. Consequentially, the printed words and visual graphics accompanying single and double LP albums, have become part of the album liner or jacket, as a matter of convention. Both the artist in the recording studio, and the listener at home using a recording playback system of one sort or another, have been able to read the words of recorded songs and/or notated music while listening to a playback of a sound recording, thereby enhancing the overall experience.

With the advent of high density information recording mediums such as laser-read compact discs (CD's), digital and analogue and audio/video-cassette tapes, and other high-density recording formats as well, the LP album has become displaced in the sound/video recording marketplace. As a result thereof, consumers have lost the large book-like album liners upon which artists have customarily embodied and published their album's program, which typically includes printed subject matter, and oftentimes, visual graphics. With this tradeoff, however, there has come some important advantages. For example, improved quality and longer playing sound and video recordings are now possible.

The typical storage case for an audio-cassette tape used, for example, in automobile tape player systems, comprises a rectangular base that is hinged to a rectangular cover. The base includes a back panel member from which a pair of spaced-apart posts project towards the hinged cover, for secure mounting of the audio-cassette tape and prevention of magnetic tape therein unwinding during storage and transit.

The rectangular cover includes a front cover panel and a short back panel fixedly spaced from the front cover panel by a pair of spaced-apart side walls having projecting hinge pins thereon. The side walls, front cover panel, and short back panel configured together define a rectangular slot into which the open exposed-tape end of the audio-cassette tape inserts.

The accompanying program typically has the LP-version liner work reduced in size to fit upon a cardboard program card, which is folded at its end and fits into the rectangular slot. The cover, and often the base, are made from a highly transparent and high-impact modern plastic so that the outwardly facing program and its literary and visual art work is clearly visible to those who might buy, examine, or otherwise use the audio-cassette tape and its matched storage case.

One of the principle drawbacks with such conventional audio-cassette tape storage cases, is that the printed matter on the program card is often too small to read without excessive eye strain and more often, the content of the printed program must be either severely reduced as a result of a limited reproduction space provided by prior art storage cases.

With compact-disc (CD) optical recordings, a similar problem arises. In such cases however, the problem is often worse since the information recording capacity of CD's are much greater than analogue recorded audio-cassette tapes, and thus naturally requires additional accompanying program literature, yet providing only a slightly larger storage case configuration for the containment of the program literature therewithin. As a result, the printed program material accompanying CD recordings has generally been reduced in size thus rendering perception of such printed matter most difficult thereby causing eye strain, headaches and frustration.

Accordingly, it is a primary object of the present invention to provide a storage case for storing information recording devices such as audio-cassette tapes and compact discs, where a Fresnel lens zone structure is formed in at least one optically transparent panel of the storage case, in order to provide a Fresnel lens formed therein so that printed matter of accompanying programs are magnified when viewed through the Fresnel lens formed in the optically transparent panel. Notably, a principal advantage of the present invention is that such storage cases can be provided without substantially altering or modifying the general dimensions of the storage cases, which are often set by recording industry standards.

Another object of the present invention is to provide such a Fresnel lens storage case for a digital audio-cassette tape (DAT) and similarly for an analog audio-cassette tape, where the Fresnel lens is formed in the front cover panel of the storage case, and ultra low-relief guide channels are provided on the edges of the short back panel of the front cover and/or the intermediate side panel of the base, as to slideably guide the program material (e.g., card) with printed matter thereon and slideably hold the extended program card, a relative fixed distance from the Fresnel lens so that a desired degree of focused magnification is achieved when viewing the program material through the front cover panel.

An even further object of the present invention is to provide such a Fresnel lens storage case for an audio-cassette tape, where the rectangular base and hingedly connected rectangular cover embodying the Fresnel Lens, are releasably lockable into a configuration which allows the base to function as a handle/support means, and the cover as an optical magnification means through which the program material can be viewed under a predetermined magnification power.

It is an even further object of the present invention to provide for compact discs, a storage case having a Fresnel lens formed in the optically transparent front cover, through which accompanying graphical program material can be viewed under desire degrees of magnifying power.

Another object of the present invention is to provide such a Fresnel lens storage case for compact disc recordings, wherein the Fresnel lens storage case can function as a simple hand-held scientific instrument with which its user can simply magnify program material such as cassette program cards, compact disc program cards or programs, dr other articles including newspapers, books, insects, stamps, currency, horticultural samples, or the like.

Other and further objects of the present invention will be explained hereinafter, and will be more particularly delineated in the appended claims, and other objects of the present invention will hereinafter become apparent to one with ordinary skill in the art to which the present invention pertains.

SUMMARY OF THE INVENTION

In accordance with the present invention, a storage case for storing information recording devices is provided having a Fresnel lens formed in one of its optically transparent panels, through which the printed matter and visual graphics of an accompanying program card or booklet, can be viewed under a desired magnification power.

Notably, as used hereinafter and in the claims, the term "graphical subject matter" shall refer to "printed matter" and/or "visual graphics" of a program card or booklet accompanying a storage case for storing an information recording device.

The storage case is primarily intended for storage of an information recording device such as an audio-cassette, video-cassette or compact disc, which is typically used along with an accompanying program including graphical subject matter.

In general, the storage case comprises an enclosing case and a Fresnel lens zone structure. The enclosing case is for enclosing and storing the information recording device and program, substantially therewithin. The enclosing case has at least one optically transparent panel and provides for the positioning of the graphical subject matter of the program, at a range of distances from the optically transparent panel and is intended for the viewing of the program subject matter through the optically transparent panel. The Fresnel lens zone structure is formed in or provided upon the surface of the optically transparent panel in order to provide a Fresnel lens, whereby the image of the printed and/or other graphical subject matter is magnified when viewed through the Fresnel lens.

In one embodiment, the storage case of the present invention is configured for enclosing and storing an information storage device of the audio-cassette tape type, in addition to a program card bearing printed matter including text and perhaps visual graphics.

In another embodiment, the storage case of the present invention is for enclosing and storing a compact disc, of the type designed for playback on a compact disc player system.

In yet another embodiment, the storage case hereof is for enclosing and storing a video-cassette tape of the type designed for playback on a video-cassette digital video system.

The audio-cassette tape storage case of the preferred embodiment, generally comprises a rectangular base that is hinged to a rectangular cover. The base includes a back panel member from which a pair of spaced-apart posts project towards the hinged cover for secure mounting of the audio-cassette tape and prevention of magnetic tape therein from unwinding during storage and transit. The cover includes a front cover panel and a short back panel fixedly spaced from the front cover panel by a pair of spaced-apart side walls having projecting hinge pins. The side walls, optically transparent front cover panel, and short back panel configured together define a rectangle slot into which the open end of the audio-cassette tape inserts during storage. The optically transparent front cover panel has formed therein, a predetermined Fresnel lens zone structure which is provided preferably to the inner protected side thereof facing the short back panel. In the preferred embodiment, the Fresnel lens zone structure generally comprises a series of concentrically arranged fine annular zones or rings of varying surface characteristics, which function to electromagnetically emulate (i.e., imitate) a lens having a substantially larger physical thickness.

The base and the front cover panel are hingedly connected by pins projecting from the side walls. There are sets of spaced-apart pins and detents (e.g., holes) formed on the side wall panels of the cover panel and base assembly, to provide a hand releasable locking mechanism between the base and the hingedly connected front cover panel. Also provided to the side wall panels are another set of pins and detents for releasably locking together the base and the Fresnel lens front cover panel, at a relative angular displacement so that the base can function as a handling/support means and the front cover panel as an optical magnifying means, through which printed or otherwise recorded program material can be viewed under a predetermined magnification.

In the preferred embodiment, the outer short back wall panel bears at its side edges, a pair of spaced-apart, very low-relief guide channel tabs within which the upper and lower edges of a conventional program card carrying, for example, an LP's "liner notes", are slideably and controllably received so that a program card can be maintained at a substantially, fixed distance from the Fresnel lens for clear, substantially stable and focused magnification therethrough.

In addition to the short back wall mounted low-relief guide channel tabs, low-relief guide channel tabs are provided to the side edges of the intermediate side wall panel of the base so that the program card can be slideably held a substantially larger distance from the Fresnel lens front cover panel, through which the program card can be viewed under predetermined magnification power.

The front cover panel, as well as the base, are made from a highly transparent and high-impact modern plastic such as polystyrene or polycarbonate so that the outwardly facing program and its literary and visual artwork is clearly visible to those who might buy, examine, or otherwise use the storage case of the present invention.

In another embodiment of the present invention, the storage base is configured for enclosing and storing a compact disc and an accompanying program booklet of card. In this particular embodiment as well, the storage case comprises a base and hingedly connected optically transparent cover panel embodying preferably on the interior surface thereof, a Fresnel lens zone structure formed therein or provided to the surface thereof. The base includes a storage post on which a compact disc is removably mounted for stable storage purposes.

On the inner surface of the base, are formed a spaced-apart upper and lower guide channel tabs for slideably receiving the upper and lower edges respectively, of the printed program booklet or card accompanying a particular compact disc. Also, in order to maintain the Fresnel lens front cover panel a slightly extended distance away from the hingedly connected base, guide slots are formed in the sides panels of the base so that the hinge pins of the Fresnel lens cover panel can slide therein as to displace and maintain the Fresnel lens cover panel, a desired extended distance away from the base upon which the program booklet is securely held in place by properly placed guide channel retention tabs.

DESCRIPTION OF THE DRAWINGS

For a further understanding of the objects of the present invention, reference is made to the following detailed description of the preferred embodiment which is to be taken in connection with the accompanying drawings, wherein:

FIG. 1 is a perspective view of an exemplary storage case constructed in accordance with the principles of the present invention, shown storing an audio-cassette tape, enclosing the accompanying program card behind and against the Fresnel lens front cover panel of the storage case while being visible without significant optical distortion;

FIG. 2 is a perspective view of the audio-cassette storage case of the present invention; shown in an open position with the audio-cassette tape removed therefrom;

FIG. 3 is a plan view of the audio-cassette tape storage case of the present invention, shown in fully open position with the base and Fresnel lens cover panel thereof lying in substantially the same plane, and with the audio-cassette tape removed therefrom;

FIG. 4 is an elevated side view of the audio-cassette tape storage case of the present invention, taken along line 4—4 of FIG. 3;

FIG. 5 is an elevated side view of the preferred embodiment of the audio-cassette storage case of the present invention taken along line 5—5 of FIG. 3;

FIG. 6 is a perspective view of the audio-cassette tape storage case of the preferred embodiment of the present invention shown configured in an open operating position where the printed program card is slideably held within low-relief guide channel tabs, at a predetermined distance from the Fresnel lens front cover panel, through which printed program matter can be viewed under a predetermined magnification;

FIG. 7 is an elevated side view of the audio-cassette tape storage case taken along line 7—7 of FIG. 6, illustrating the geometrical optical principles underlying the present invention;

FIG. 8 is a plan view of an exemplary compact disc storage case constructed in accordance with the principles of the present invention, shown with the accompanying program booklet held securely to and rendered clearly visible behind the Fresnel lens front cover panel of the storage case without significant optical distortion;

DETAILED DESCRIPTION OF THE PREFERRED EMBODIMENTS

Figure 9:
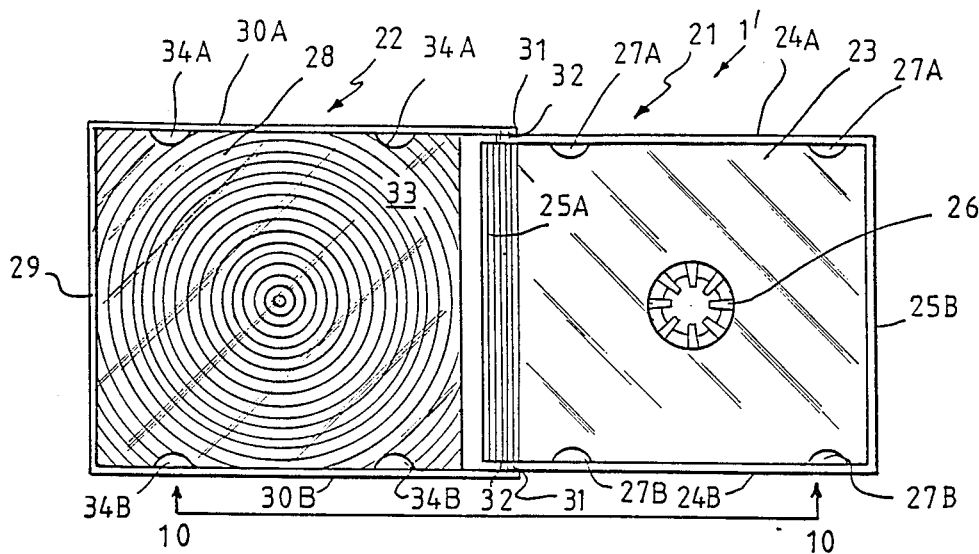
FIG. 9 is a plan view of the compact disc storage case of the present invention shown with the compact disc or accompanying program booklet removed therefrom, and configured in an open position with the Fresnel lens front cover panel and base lying substantially within the same plane.
Figure 10:
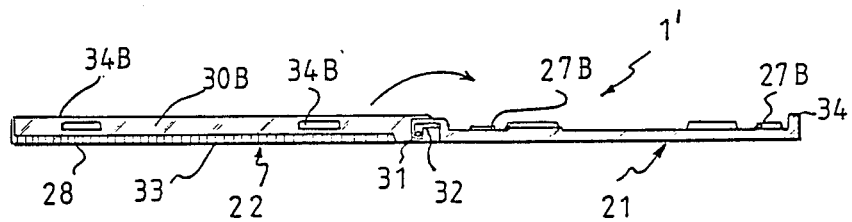
FIG. 10 is an elevated side view of the compact disc storage case of the present invention, taken along line 10—10 of FIG. 9.

Referring to FIGS. 1–7 in particular, one embodiment of the storage case of the present invention is shown in the form of an audio-cassette tape storage case 1.

The audio-cassette tape storage case 1 in general comprises a rectangular base 2 that is hinged to a rectangular cover 3. The rectangular base 2 includes a pair of spaced-apart side walls 4A and 4B, joined by an intermediate side panel 4C, which are disposed about the perimeter of a back panel member 5 from which a pair of spaced-apart posts 6A and 6B project towards the hinged cover 3 for secure mounting of the audio-cassette tape 6 and prevention of magnetic tape thereof from unwinding during storage and transit.

The cover 3 includes an optically transparent front cover panel 7 and a short back panel 8 fixedly spaced from the front cover panel by a pair of spaced-apart side walls 9A and 9B. The side walls 9A and 9B, optically transparent front cover panel 7, and short back panel 8 configured together define a rectangular slot into which the open end of the audio-cassette tape 6 inserts, in a manner known in the audio-cassette tape storage case art.

The optically transparent front cover panel 7 has formed therein, a predetermined Fresnel lens zone structure 11 which is provided preferably to the inner protected side of the cover panel 7 facing the short back pan el 8. In the preferred embodiment, the Fresnel lens zone structure 11 generally comprises a series of concentrically arranged, fine annular zones and/or rings of varying surface characteristics which function to electromagnetically emulate (i.e., imitate) a lens having a substantially larger physical thickness. Examples of Fresnel zone formation techniques can be found, for example, in U.S. Pat. No. 4,643,752 to Howard et al.; U.S. Pat. Nos. 3,739,455 and 3,829,536 to Alvarez;; and in U.S. Patents referred to therein, all of which are incorporated herein by reference as if fully set forth herein.

Alternatively, the Fresnel zone structure 11 can be formed in a thin optically transparent film structure, Which can be bonded to the inside or outside surface of the front cover panel 7 without substantially increasing the physical dimensions thereof.

The base 2 and front cover panel 3 are hingedly connected by pins 10 projecting from the side walls 9A and 9B. There is a set of spaced-apart pins 12 and detents 13 (e.g., holes or recesses) formed on the side wall panels 9A and 9B of the cover panel assembly 3 to provide a hand actuatable/releasable locking mechanism between the base 2 and the hingedly connected front cover panel 3. Also provided to the side wall panels 9A and 9B are another set of pins 14 and detents 15 for releasably locking together the base 2 and the Fresnel lens front cover panel 7 at one of several-possible relative angular displacements so that the base 2 can function as a handling/support means and the front cover panel 3 as an optical magnifying means, through which printed program material can be viewed under a predetermined magnification.

Referring to FIGS. 4, 6 and 7 in particular, the short back wall panel 8 bears at its side edges, a pair of spaced-apart, very low-relief guide channel tabs 16 within which the upper and lower edges of a conventional program card 17 carrying for example an LP's "liner notes", are slideably and controllably received. This feature of the present invention allows the program card 17 to be maintained at a substantially fixed distance from the Fresnel lens 7 for clear and stable magnification therethrough.

The overall height-wise dimensions of the guide channels 16 preferably should be sufficiently low, e.g., less than 1.5 millimeters, to ensure that the guide channels 16 do not project outwardly from the back Wall panel 8 as to prevent or otherwise hinder the stacking of a plurality of audio-cassette tape storage cases of prevention.

Referring to FIGS. 2, 3, 4 and 6 in particular, an alternative embodiment of the program card guide channel feature of the present invention is illustrated. Instead of placing the spaced-apart guide channels 16 on the outside of the back wall panel 8 of the storage case 1, as illustrated in FIGS. 2–7, the guide channel 16' can be positioned on the ends of the intermediate side wall panel 4C of the base 2. This alternative arrangement allows for the program card 17 to be slideably disposed in the guide channels 16', and positioned a distance away from the Fresnel lens front cover panel 7 approximately equal to the length of the side wall panels 4A and 4B of the base 2. This arrangement also provides for slideable holding of the program card 17 as does the arrangement described hereinbefore, but has the additional advantage of not requiring the placement of guide channel tabs on the back wall panel 8 of the cover 3, thereby facilitating stacking of several cassette tape storage cases 1 without any structural features of the storage case 1, hindering such desired stacking.

The frontcover panel 7, in which the Fresnel zone structure 11 is formed, is made from a highly transparent and high-impact modern plastic such as polystyrene or polycarbonate. This feature of the present invention ensures that the outwardly facing program card 17 and its literary and visual art work is (i) clearly visible when stored within and behind the front cover panel 7 of the storage case 1, and (ii) is clearly magnified when viewed through the Fresnel lens formed in the front cover panel 7.

Referring now to FIGS. 8–12, an alternative embodiment of the present invention is illustrated, wherein the storage case of the present invention is in the form of a compact disc storage case 1'.

The compact disc storage case 1' is configured for enclosing and storing a compact disc (not shown) and an accompanying program booklet 20. The compact disc storage case 1' comprises a base 21 and an optically transparent cover 22 which is hingedly connect to the base 21. The base 21 includes a back panel 23 from which a pair of end side panels 24A and 24B, and a pair of opposing front and rear side panels 25A and 25B project and are configured together to form a substantially square structure. The back panel 23 includes a centrally disposed storage post 26 on which a compact disc (not shown) is removably mounted for stable storage purposes, in a manner known in the art.

On the inner surface of the base 21, are formed a spaced-apart upper and lower guide channel tabs 27A and 27B respectively, for slideably receiving the upper and lower edges respectively, of the printed program booklet 20 accompanying a particular compact disc.

The optically transparent cover 22 includes a front cover panel 28, and front side wall 29, and a pair of opposing end side walls 30A and 30B, which project orthogonally from the front cover panel 28. The end portions of the side panels 30A and 30B have a pair of projecting pins 31 which are received in a pair of holes/slots 32 formed in the end portions of the side panels 24A and 24B of the base 21.

Figure 11:
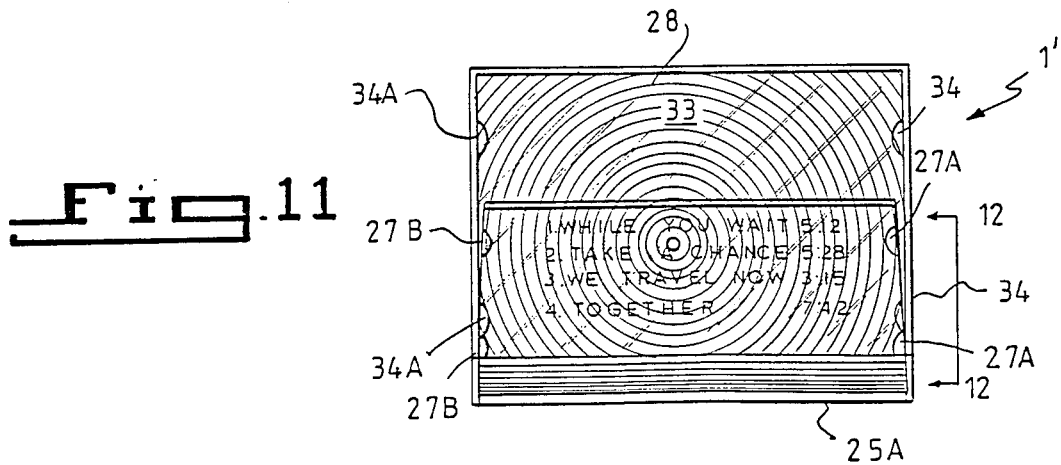
FIG. 11 is a perspective view of the compact disc storage case shown in FIGS. 8-10, shown in open operating position, looking through the Fresnel lens front cover panel, at the printed matter of the accompanying program booklet securely held in place on the top surface of the base by way of spaced apart upper and lower guide channel tabs.

Referring to FIGS. 9 and 11, in particular, the optically transparent front cover panel 28 has a Fresnel lens zone structure 33 formed, preferably oh the inside thereof. The Fresnel lens zone structure 33 is, in general, similar to the Fresnel lens zone structure 11 described in connection with the audio-cassette tape storage case 1, and thus regarding the details of designing and forming such structures on the optically transparent front cover panel 28, reference is made to the U.S. Patents incorporated herein by reference.

In order to maintain the program booklet 20 against the Fresnel lens front cover panel 28 when the compact disc is stored on post 26, a pair of upper and lower retention tabs 34A and 34B, respectively, are provided to the front cover panel 28, in a manner known in the art.

Figure 12:
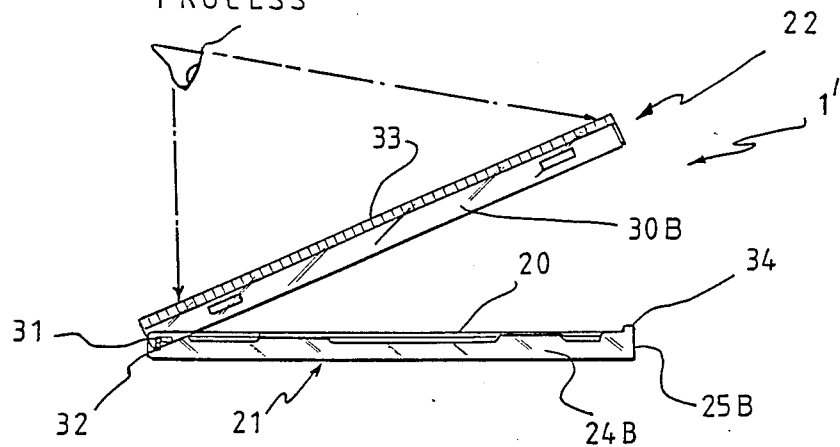
FIG. 12 is an elevated side view of the compact disc storage case of the present invention, shown taken along line 12—12 of FIG. 11.

Referring to FIGS. 11 and 12, the compact disc storage case 1' of the present invention is shown used in its open position, with program booklet 20 secured to base 21 under tabs 27A and 27B. When a viewer looks through the Fresnel lens front cover panel 28, the image of the program booklet graphics are magnified under desired magnification. The angle at which the front cover panel 28 is disposed with respect to base 21, can be releasably fixed by means similar to that provided to cassette tape storage case 1.

Figure 13:
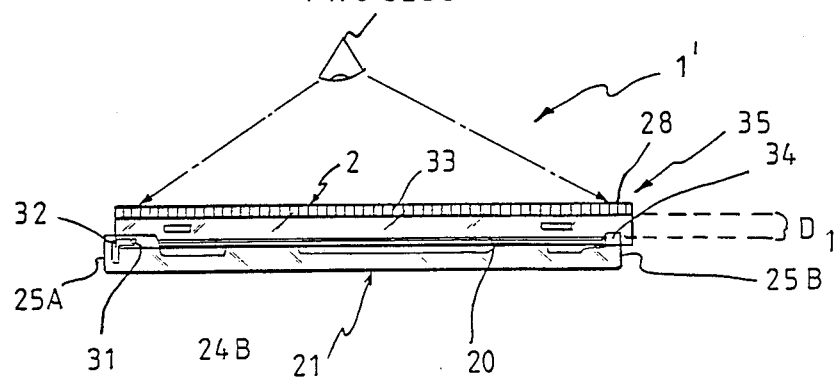
FIG. 13 is an elevated side view of the compact disc storage case of the present invention, shown with the Fresnel lens front cover panel closed upon the base and disposed a predetermined distance away from the program booklet, to provide desired magnification of images in the program booklet.

Referring to FIG. 13 in particular,, an elevated side view of the compact disc storage case 1' of the present invention is shown, with the Fresnel lens front cover panel 28 closed upon the upper inner perimeter of the base 21 and disposed a predetermined distance $D_1$, away from the program booklet 20. In this configuration, a predetermined magnification of the visual images of the pre-recorded program booklet 20, is achieved, while the booklet 20 is preferably held securely in place under the engaging flange surfaces of the molded guide channel tabs 27A and 27B disposed about the inner perimeter of the Fresnel lens front cover panel 28.

The L-shaped grooves 32 formed in the end portion of the opposing and side walls 24A and 24B of the base 21, provide a channel or track in which the pins 31 are free to move within. The pins 31 and the entire Fresnel lens front cover 28 to which the pins 31 are fixedly attached, can slide along the L-shaped channel groove 32 and move further away from the base 21 slightly, so that the opposing end 35 of the front cover panel 28 rests upon the adjacent end support flange 34, and the Fresnel lens front cover panel 28 is disposed substantially parallel from the plane of the base 21, on the order of distance $D_1$. The magnification of the Fresnel lens front cover panel 28 can be made with consideration given towards distance $D_1$, the distance defined between the program booklet 20 and the Fresnel lens panel 28.

Yet another embodiment of the present invention involves embodying a Fresnel lens zone structure in an optically transparent planar panel of a video-cassette tape storage case, and providing spaced-apart guide channels for slideably holding a program card and/or booklet a predetermined or variable distance away from the Fresnel lens front cover panel, for stable magnification of images from the program card and/or booklet.

It is contemplated that modification to the storage cases hereof would involve using accompanying program cards or booklets in the form of light transparent film structures which can be viewed through the Fresnel lens storage cases of the present invention, while looking, for example, up towards a source of incandescent or sun light. In addition, the film structure can be a holographically recorded film strip of suitable dimensions to enable it to slide in and along the spaced apart guide-channels of the storage cases hereof.

In addition, the storage cases of the present invention can be used to magnify the print of a daily newspaper or magazine by placing the base portion thereof upon the newspaper or magazine page, locking the Fresnel lens cover panel into one of its lockable positions, and looking through the Fresnel lens front cover panel as discussed hereinbefore.

Alternatively, the storage cases hereof can be used to magnify objects found in nature, such as flowers, insects, and the like, or man-made objects such as stamps, currency, maps and the like.

While the particular embodiments shown and described above have been proven to be useful in many applications involving the information recording device storage case art, further modifications of the present invention herein disclosed will occur to persons skilled in the art to which the present invention pertains and all such modifications are deemed to be within the scope and spirit of the present invention defined by the appended claims.

What is claimed is:

1. A storage case for storage of an information recording device and an accompanying program including graphical subject matter thereon, said storage case comprising;
   (a) an enclosing case for enclosing and storing the information recording device and the program substantially therewithin, said enclosing case having at least one optically transparent panel for enclosing said accompanying program behind and against said optically transparent panel, and said enclosing case providing for the positioning of the graphical subject matter at a range of distances from said optically transparent panel, and for the viewing of said graphical subject matter through said optically transparent panel; and
   (b) a Fresnel lens zone structure provided to said optically transparent panel to form a Fresnel lens therein, said accompanying program being visible without magnification and significant optical distortion when enclosed behind and against said optically transparent panel having said Fresnel lens formed therein, whereby said graphical subject matter when positioned at one of said distances from said optically transparent panel, is magnified when viewed through said Fresnel lens formed in said optically transparent panel.

2. The storage case of claim 1, wherein the information storage device is an audio-cassette tape, said enclosing case is an audio-cassette storage tape, and said program is a program card.

3. The storage case of claim 2, wherein said enclosing case comprises a base and a cover which is hingedly connected to said base, said cover including said optically transparent panel with said Fresnel lens zone structure formed therein.

4. The storage case of claim 3, wherein said enclosing case includes means for releasably locking together said base and said optically transparent cover panel at least one relative angular displacement so that said base can function as a support means and said optically transparent cover panel can function as an optical magnifying means through which said graphical subject matter of said program card can be viewed under magnification.

5. A storage case for storage of an audio-cassette tape and an accompanying program card including graphical subject matter thereon, said storage case comprising:
   (a) an enclosing case for enclosing and storing the audio-cassette tape and the program card substantially therewithin, said enclosing case including a base and a cover which is hingedly connected to said base, and further having at least one optically transparent panel formed in said cover and providing for the positioning of the graphical subject matter at a range of distances from said optically transparent panel, and for the viewing of said graphical subject matter through said optically transparent panel, said cover further including a short back panel fixedly spaced from said optically transparent panel by a pair of spaced-apart side walls, said side walls, optically transparent front cover panel and short back panel configured together to form a rectangular slot into which the open end of the audio-cassette tape inserts during storage,
   said short back panel bearing at its side edges, a pair of spaced-apart low-relief guide channel means within which the upper and lower edges of the accompanying program card is slideably and controllably received so that the program card can be maintained at a substantially fixed distance from said optically transparent panel; and
   (b) a Fresnel lens zone structure formed in said front cover panel to form a Fresnel lens therein, whereby substantially stable magnification of said graphical subject matter is provided when said program card is viewed through said Fresnel lens formed in said optically transparent panel of said cover.

6. A storage case for storage of an audio-cassette tape and an accompanying program card including graphical subject matter thereon, said storage case comprising:
   (a) an enclosing case for enclosing and storing the audio-cassette tape and the program substantially therewithin, said enclosing case including a base and a cover which is hingedly connected to said base, and further having a least one optically transparent panel formed in said cover and providing for the positioning of the graphical subject matter at a range of distances from said optically transparent panel, and for the viewing of said graphical subject matter through said optically transparent panel
   said base further including a pair of spaced-apart side walls joined by an intermediate side panel, said side walls and intermediate side panels being disposed about the perimeter of said back panel, said intermediate side panel bearing at its side edges, a pair of spaced-apart low-relief guide channel means within which the upper and lower edges of the accompanying program card can be maintained at a substantially fixed distance from said optically transparent panel; and (b) a Fresnel lens zone structure formed in said front cover panel to form a Fresnel lens therein, whereby substantially stable magnification of said graphical subject matter is provided when said program card is viewed through said Fresnel lens formed in said optically transparent panel of said cover.

7. The storage case of claim 3, in combination with an audio-cassette tape and a program card.

8. The storage case of claim 7 wherein said program card comprises a light translucent film structure having graphical subject matter recorded therein.

9. The storage case of claim 1 wherein the information storage device is a compact disc and said enclosing case is a compact disc storage case.

10. The storage case of claim 9, wherein said enclosing case comprises a base and a cover which is hingedly connected to said base, said cover including said optically transparent panel with said Fresnel lens zone structure formed therein.

11. The storage case of claim 10, wherein said enclosing case includes means for releasably locking together said base and said optically transparent cover panel at least one relative angular displacement so that said base can function as a support means and said optically transparent cover panel can function as an optical magnifying means through which said graphical subject matter of said program and be viewed under magnification.

12. A storage case for storage of a compact disc and an accompanying program including graphical subject matter thereon, said storage case comprising:

(a) an enclosing case for enclosing and storing the information recording device and the program substantially therewithin, said enclosing case including a base and a cover which is hingedly connected to a said base, and further having at least one optically transparent panel and providing for the positioning of the graphical 13. The storage case of claim 1, wherein the information storage device is a video-cassette tape and said enclosing case is a video-cassette tape storage case.

* * * * *